United States Patent [19]

Greene

[11] Patent Number: 5,409,323
[45] Date of Patent: Apr. 25, 1995

[54] FASTENER SYSTEM FOR ATTACHING CUSHIONS TO CHAIRS

[75] Inventor: Michael W. Greene, Incline Village, Nev.

[73] Assignee: Resinform, Incline Village, Nev.

[21] Appl. No.: 116,766

[22] Filed: Sep. 7, 1993

[51] Int. Cl.⁶ .............................................. F16B 7/18
[52] U.S. Cl. ............................ 403/343; 411/394; 411/437; 297/452.55
[58] Field of Search ............ 403/343; 411/411, 424, 411/394, 437, 436; 297/452.48, 452.55

[56] References Cited

U.S. PATENT DOCUMENTS

| | | | |
|---|---|---|---|
| 2,632,479 | 3/1953 | Pfeil | 411/437 |
| 3,103,082 | 9/1963 | Baermann | 297/452.48 |
| 3,851,920 | 12/1974 | Harris et al. | 297/452.55 |
| 4,571,136 | 2/1986 | Peek | 411/437 |
| 4,828,444 | 5/1989 | Oshida | 411/437 |
| 4,861,206 | 8/1989 | Riedel | 411/411 |
| 5,190,424 | 3/1993 | Kazino et al. | 411/394 |
| 5,290,131 | 3/1994 | Henriksen | 411/424 |

*Primary Examiner*—Edward K. Look
*Assistant Examiner*—Mark Sgantzos
*Attorney, Agent, or Firm*—Hovey, Williams, Timmons & Collins

[57] ABSTRACT

A releasable quick-coupling fastener assembly includes a backing sheet (22) having a number of apertured ovaloid bosses (24, 76–90) each presenting a resilient inboard wall structure (108) and resilient inner connective walls (110 and 112) from which depend inwardly extending lip members (118 and 120). The assembly further includes a threaded member (20) having a head (26) and a helically flighted shank (38) for insertion within a boss aperture (106) through a straight application of force by which the shank thread structure (40–54) deformably engages the lip members (118 and 120). The threaded member (20) and be released from engagement with the boss (e.g., 24) through counterclockwise rotation.

9 Claims, 3 Drawing Sheets

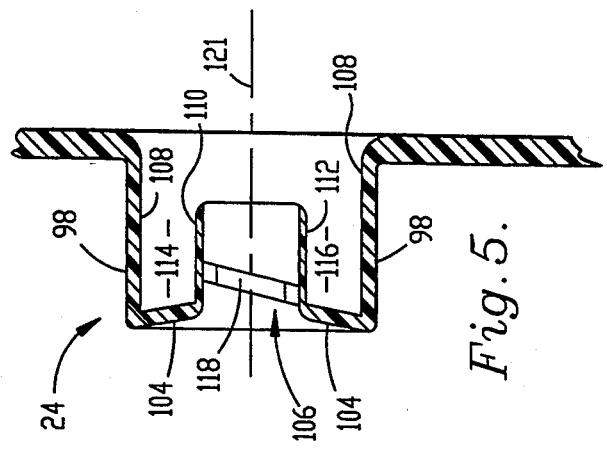
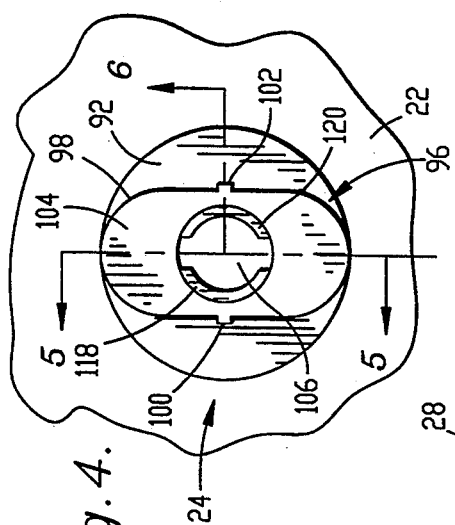
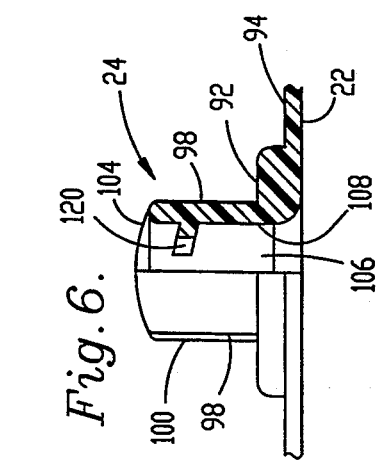
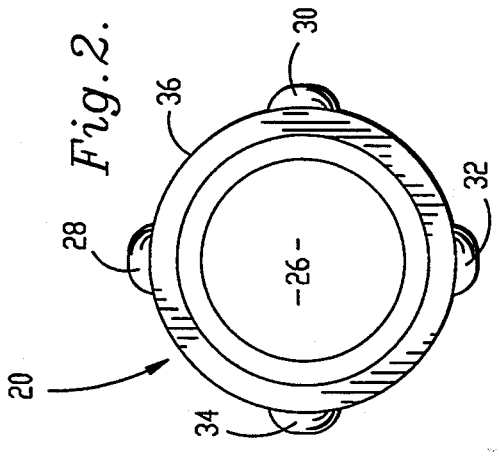
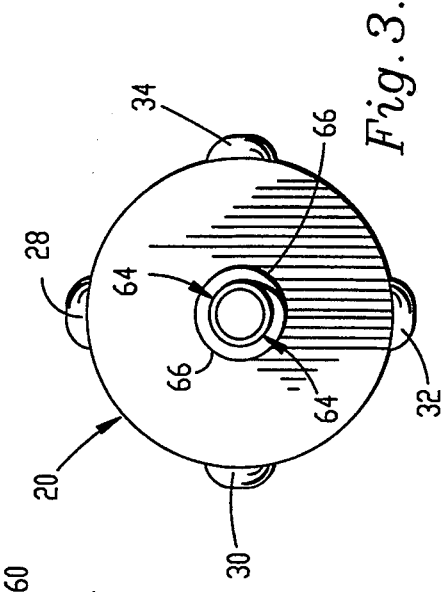

FASTENER SYSTEM FOR ATTACHING CUSHIONS TO CHAIRS

BACKGROUND OF THE INVENTION

1. Field of the Invention

The invention broadly pertains to the field of detachable quick-coupling fasteners and, more particularly, to fasteners having a female receptor in the form of an apertured boss which engages a male threaded shaft member. More specifically, the invention incorporates a backing sheet presenting at least one apertured boss having an inboard wall structure and an internal lip member, which resiliently deform to accommodate and engage root and crest structure on the threaded shaft as the shaft is forcibly inserted into the apertured boss. The shaft can subsequently be released or disengaged from the boss through rotation of the shaft.

2. Description of the Prior Art

It is known to provide quick-coupling fasteners that incorporate a female receptor containing flexible spring-lip members which resiliently deform in order to accommodate and engage a protruding male member. One such example would include the snap-button that is commonly in place on many articles of clothing. Other quick-coupling devices, and particularly devices that are used to quick-couple cushions to furniture such as chairs and the like, are permanent types of fasteners because they must endure substantial stresses over a long period of time. These types of permanent fasteners are often damaged in the after market as consumers attempt to remove them temporarily from their installed positions.

In the case of quick-coupling fasteners that attach cushions to furniture, manufacturers must balance manufacturing efficiency against the desires of consumers and the capacity to sell replacement cushions. It is relatively economical to employ push-types of quick-coupling fasteners in manufacturing processes because a resiliently deformable push-type of member can be inserted into locking engagement with a receptor more quickly and easily than, for example, a comparable externally threaded shaft can be rotated into engagement with an internally threaded receptor. Furthermore, it is desirable to adhesively affix the cushions onto the furniture in order to prevent cushion misalignment during use. However, customers, and especially those who are purchasing outdoor lawn furniture, want cushions that can be removed from time to time for cleaning and replacement. It is unfortunate that the permanent types of fastening means, while convenient for manufacturing purposes and sturdy enough to withstand the stresses of normal use, fail to enable consumers to easily clean or replace existing cushions. Therefore, a heartfelt need exists for a sturdy and detachable quick-coupling assembly that will secure cushions onto furniture.

SUMMARY OF THE INVENTION

The present invention solves the problem observed in the prior art by providing a sturdy and detachable quick-coupling assembly that will secure cushions onto furniture. More generally, the invention is useful as a generic fastening assembly for fastening items in place upon an apertured mounting member.

In broad terminology, the invention is a quick-coupling fastener assembly for releasably securing items in place upon an apertured mounting member such as, for example, an assembly that can be used to attach a cushion to the back of a chair. More particularly, the assembly of the invention includes a backing sheet presenting a face having at least one outwardly extending apertured boss with a deformable inboard wall structure having interior lip members for resiliently accommodating and engaging a threaded member that may be subsequently disengaged through rotation of the threaded member. Still more specifically, the assembly includes a backing sheet presenting a face adapted for engagement with the apertured mounting member by means of at least one apertured boss extending outwardly from the face for receipt within a member aperture. The boss includes inboard wall structure presenting a passageway, and obliquely oriented lip means extending inwardly from the wall structure into the aperture passageway, where the inboard wall structure and lip are formed of resilient, deformable synthetic resin material. A threaded member having a head and an elongated, helically flighted shank extending from the head presents adjacent root and crest structure sized for insertion into the boss aperture by application of an axially directed pushing force on the head, with the inboard wall structure and lip deforming and expanding resiliently and radially outwardly under the influence of the pushing force to accommodate the shank. The inboard wall structure and lip resiliently move inwardly when the shank is seated within the passageway for locking interengagement between the lip and root and crest structure which is formed from the helical flights of the shank. The head engages a face of the member remote from the backing sheet for holding the backing sheet in place upon the mounting member. The root and crest structure, and the lip means are cooperatively configured for release of the threaded member from the boss by rotation of the threaded member.

Preferred embodiments incorporate a number of improvements on the basic assembly. The mounting member aperture and the boss may each assume an ovaloid shape that engage to prevent torque deformation of the backing sheet. The boss may include interior walls extending across the ovaloid faces of the inboard wall structure, in order to define a cylindrical aperture in the boss. The root and crest structure may include a beveled edge facing towards the backing sheet and a flat edge facing outwardly away from the backing sheet. The shank may contain a guide bevel, and the backing sheet may have a furniture cushion adhesively affixed thereto.

BRIEF DESCRIPTION OF THE DRAWINGS

FIG. 1 is a side view of a threaded member which forms a component of the present invention;

FIG. 2 is a front view thereof;

FIG. 3 is a rear view of the threaded member;

FIG. 4 is a front view of a boss for receiving the threaded fastener;

FIG. 5 is a side cross-sectional view of the boss member taken along line 5—5 of FIG. 4;

FIG. 6 is a side cross-sectional view of the boss member taken along line 6—6 of FIG. 4 and rotated 90 degrees;

DETAILED DESCRIPTION OF THE PREFERRED EMBODIMENT

Figure 9:
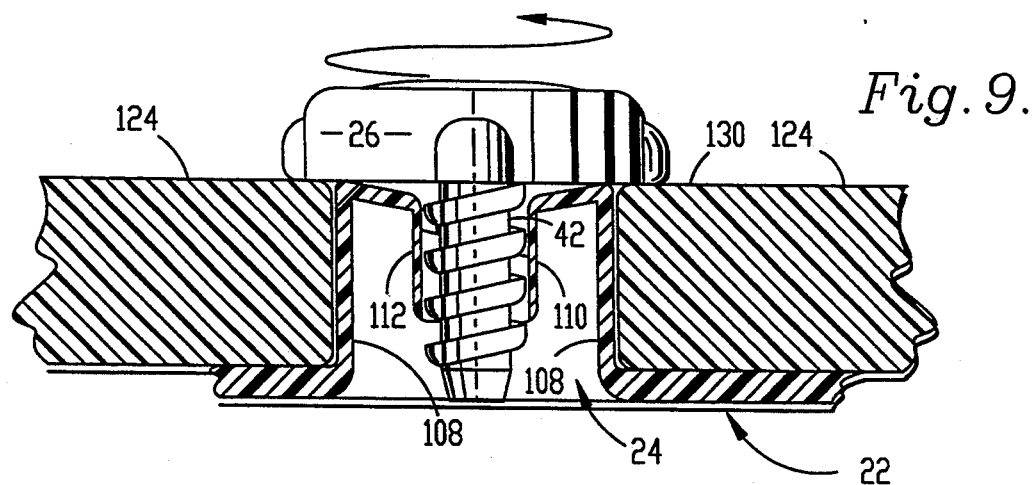
FIG. 9 depicts the combination of FIG. 8 in the stage of final assembly.

The assembly of the invention includes threaded member 20 (FIG. 1), and backing sheet 22 (FIG. 10) presenting a number of bosses, e.g., boss 24 (FIG. 4), that are ultimately assembled in the manner shown by FIG. 9. FIGS. 1 and 2 show that threaded member 20 has a rounded head 26, and a number of equally spaced knobs 28, 30, 32, 34 extend from a circumference 36. An elongated shank 38 extends transversely from the plane of head 26, and helical flights 40 present thread root structures 42, 44, and 46 as well as thread crest structures 48, 50, 52, and 54. Respective crest structures 48–54 each include a bevel facing remotely from head 26, e.g., bevel 56, and a flat surface proximal to head 26, e.g., surface 58. End 60 is remote from head 26 and presents guide bevel 62. As can be seen from FIG. 3, shank 38 presents a root diameter 64 to 64' and a crest diameter 66 to 66'.

Figure 10:
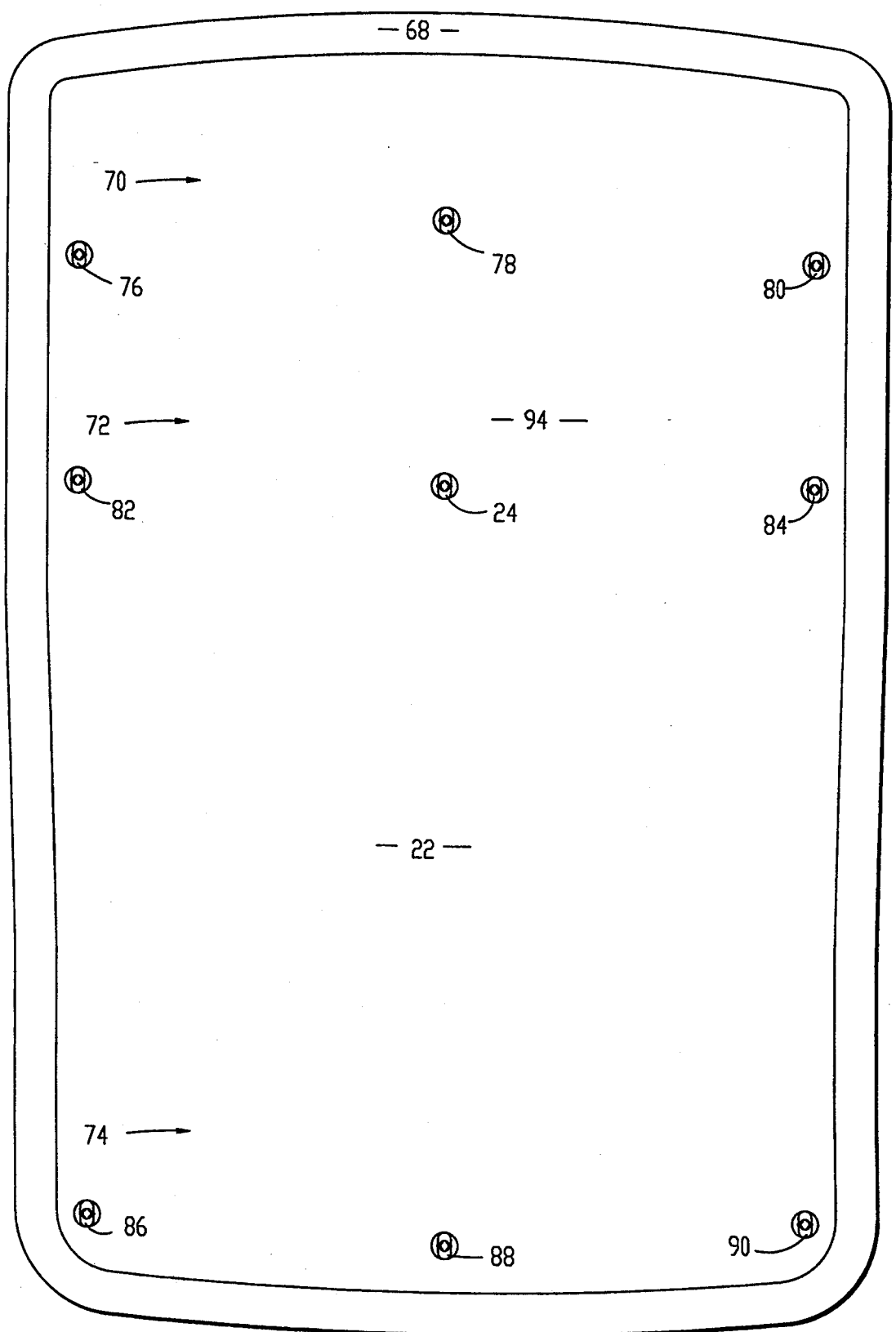
FIG. 10 presents a rear view of the backing sheet from which depends a number of the bosses depicted in FIG. 4.

FIG. 10 shows backing sheet 22, which is configured for use in a chair cushion assembly. A fabric-covered foam cushion 68 is adhesively affixed to the side of sheet 22 that is remote from the view of FIG. 10. Furthermore, sheet 22 incorporates a number of bosses (e.g., boss 24) that are integrally formed on sheet 22 in various rows 70, 72, and 74. Rows 70 and 72 define a seating portion on sheet 22, which consists of bosses 76, 78, 80, 82, 24, and 84. Row 74 includes bosses 86, 88, and 90, which depend from the back portion of sheet 22. All of the bosses 24, and 76–90 on sheet 22 are identical in their respective constructions and, like sheet 22, they are formed of a resiliently deformable material such as polypropylene.

Boss 24 exemplifies the like construction of bosses 76–90, and this construction is best presented in FIGS. 4–6. Boss 24 has a rounded lower portion 92 that rises outwardly away from face 94 of sheet 22. Ovaloid structure 96 extends further outwardly from portion 92, and presents outboard wall structure 98. Reinforcing ridges 100 and 102 extend outwardly from portion 92 and along outboard wall structure 98. Convex top section 104 extends across outboard wall structure 98, and defines aperture 106 which extends in a passageway through boss 24. Aperture 106 has a cylindrical shape that is defined by ovaloid inboard wall structure 108 proximal to ridges 100 and 102 as well as arcuate interior walls 110 and 112 which extend between opposed surfaces of inboard wall 108. The positioning of walls 110 and 112 further defines interior spaces 114 and 116 that exist between respective walls 110 and 112 and inboard wall 108. Lip members 118 and 120 each depend from respective inboard wall structure 108 and interior walls 110–112, and project into aperture 106 along an arc of less than 180 degrees of rotation in a respective planes that are obliquely oriented to axis of symmetry 121 in order to match a corresponding angle within each of root structures 42–46. Furthermore, lip members 118 and 120 have dimensions that are sufficient to engage shank 38 by lying within root structures 42–46.

Figure 7:
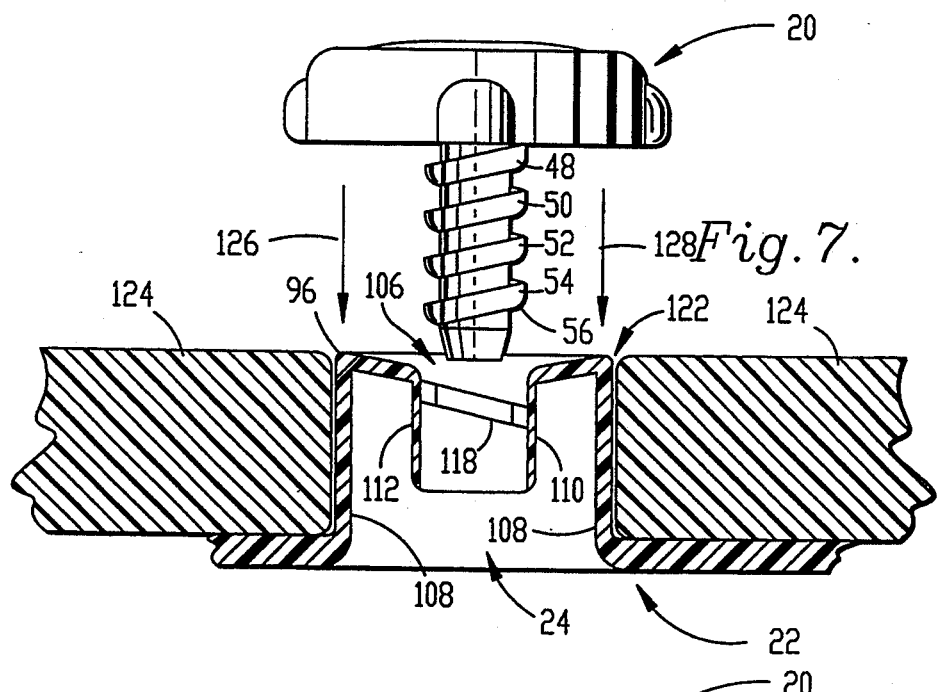
FIG. 7 is a partial cross-sectional view of the threaded member and the boss of the present invention in the first stage of assembly for use as a fastener that is inserted through the back of a chair.
Figure 8:
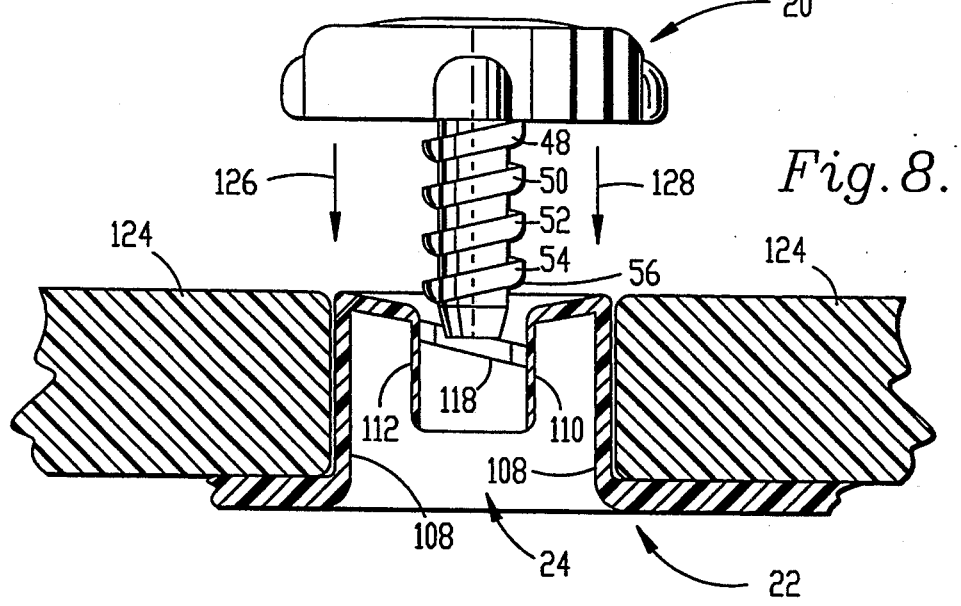
FIG. 8 depicts the combination of FIG. 7 during a stage of assembly subsequent to the stage of FIG. 7.

FIGS. 7, 8, and 9 depict the sequence of events in the assembly and operation of threaded member 20 and backing sheet 22. Ovaloid structure 96 is positioned within a corresponding ovaloid aperture 122 within a mounting member 124, such as the uncushioned seat portion of a chair, wherein the dimensions of aperture 122 are slightly greater than the dimensions of structure 96. Threaded member 20 is positioned as shown in FIG. 7 for insertion into aperture 106 and, subsequently, is advanced towards boss 24 as is shown in FIG. 8 until guide bevel 62 enters aperture 106 and bevel 56 of crest 54 contacts lip member 118. Upon contact, increasing force is applied in the direction of arrows 126 and 128 until the corresponding outward application of force through crest 54 to lips 118 and 120 is sufficient to resiliently deform the wall between surfaces 98 and 108 as well as interior walls 110 and 112 by causing the respective walls to extend radially outwardly for a distance sufficient to accommodate the passage of crest 54. Interior walls 110 and 112 are more readily deformable than the wall defined by surfaces 98 and 108, due to the fact that interior walls 110 and 112 are relatively thinner along line 5—5 as can be seen in FIG. 5. Once crest 54 passes lips 118 and 120, the resiliency of walls 108, 118, and 120 forces lips 110 and 112 into engagement with crest 46, and then a straight application of reverse force will not easily withdraw shank 38 from within aperture 106. The insertion procedure is repeated crest by crest for each of crest structures 52–50 until shank 38 is at last fully inserted as shown in FIG. 9 with lip members 118 and 120 engaging root structure 42. Head 26 engages top section 104 as well as outer face 130 of member 124 at a position remote from backing sheet 22. In the event that a straight application of force in the direction of arrows 126 and 128 is insufficient to cause threaded member 20 to abut top 104, a final tightening can be performed by rotating head 26 in a clockwise direction from the perspective of FIG. 2. Threaded member 20 rotatably disengages boss 24 through counterclockwise rotation, as is depicted in FIG. 9. The assembled ovaloid structure 96 and ovaloid aperture 122 cooperate to prevent the deformation of cushion 68 through torquing that may occur as a user moves about after sitting upon cushion 68. Knobs 28–34 enhance the rotational capacity of member 20 by providing a surface that may be easily grasped by the hand.

It will be apparent from the above description that the assembly of the invention provides a quick-coupling fastener assembly for releasably securing items in place upon an apertured mounting member 124 through plastic deformation that occurs during the insertion of threaded member 20 into boss 24. This assembly is particularly useful for attaching a cushion-bearing backing sheet to furniture items and the like. Other, less preferred, embodiments exist which are also within the scope of the invention. For example, lip members 118 and 120 may be attached to walls 108, 110, and 112 by means of a tapered structure at the junction between the respective walls and lip members, which causes lip members 118 and 120 to pivot downwardly and radially outwardly in order to accommodate crest structures 48–54. Additionally, boss 24 need not present ovaloid structure 96, and interior walls 110–112 are not required, in which case lip members 118 and 120 can be mounted entirely upon a tubular wall defined by inboard wall surface 98 and outboard wall surface 108. Those who are skilled in the art will understand that these types of changes may be performed upon the preferred embodiment without departing from the spirit of the invention.

We claim:

1. A fastener assembly for releasably securing an item in place upon a mounting member having an aperture of ovaloid shape, said assembly comprising:

a backing sheet presenting a face and an apertured boss extending outwardly from said face for receipt within said mounting member aperture, said boss including inboard wall structure presenting a passageway, an out-board portion presenting structure having an ovaloid shape corresponding to the shape of the aperture of the mounting member, and obliquely oriented lip means extending inwardly from said wall structure into said passageway, said inboard wall structure and lip being formed of resilient, deformable synthetic resin material; and a threaded member having a head and an elongated, helically flighted shank extending from the head and presenting adjacent root and crest structures, said shank being received in said boss aperture by application of an axial pushing force on said head, with said inboard wall structure and lip deforming and expanding resiliently and radially outwardly under the influence of said pushing force to accommodate said shank, and with the inboard wall structure and lip resiliently moving inwardly when the shank is seated within the passageway for locking interengagement between the lip and said root and crest structure, said head engaging the face of said mounting member remote from said backing sheet for holding the backing sheet in place upon the mounting member, said root and crest structure, and said lip means being cooperatively configured for release of said threaded member from said boss by rotation of the threaded member.

2. The assembly as set forth in claim 1, said boss including an outboard wall structure having a reinforcing ridge extending in a direction outwardly from said face of said backing sheet.

3. The assembly as set forth in claim 1, said boss including inner walls defining a cylindrical aperture within said boss and extending across said inboard wall structure from one face to another face to form a region of interior space between said inner walls and said inboard wall structure.

4. The assembly as set forth in claim 1, said crest structure including a beveled edge facing towards said backing sheet and a flat edge facing outwardly away from said backing sheet.

5. The assembly as set forth in claim 1, said shank including a guide bevel.

6. The assembly as set forth in claim 1, said head presenting a circumference having four equally spaced knobs.

7. The assembly as set forth in claim 1, said backing sheet including a furniture cushion affixed thereto.

8. The assembly as set forth in claim 1, said backing sheet including a seating portion having two rows of matching bosses and a back portion having a single row of matching bosses.

9. A fastener assembly for use in securing an item in place upon a mounting member, the mounting member including at least one aperture, the assembly comprising:

a backing sheet attachable to the item and including a boss presenting a circular aperture extending in a direction perpendicular to the backing sheet, and a pair of arcuate lip members provided opposite one another within the circular aperture, the lip members being formed of resilient, deformable synthetic resin material; and a threaded member including a threaded shank received in the circular aperture of the boss in engagement with the lip members, and a head having a diameter larger than the boss aperture and extending radially beyond the boss for holding the mounting surface between the head and the backing sheet when the threaded member is received in the boss aperture, the shank including a thread presenting a convex, curved surface facing away from the head, a flat surface facing toward the head, and a crest defined by the line of intersection between the curved and flat surfaces.

* * * * *